UNITED STATES PATENT OFFICE.

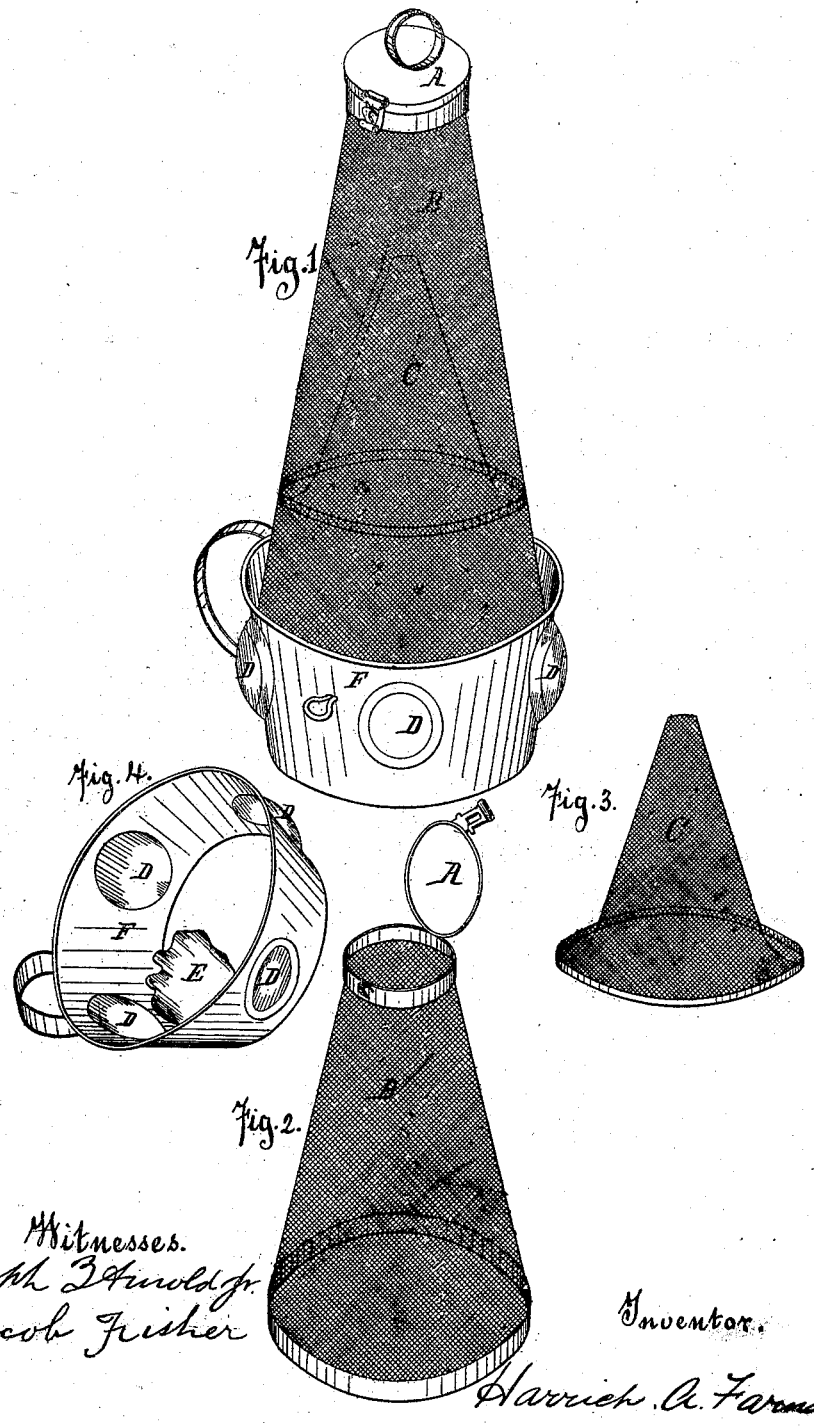

HARRIET A. FARNAM, OF SOUTH BEND, INDIANA.

IMPROVEMENT IN FLY-CATCHERS.

Specification forming part of Letters Patent No. 111,332, dated January 31, 1871.

*To all whom it may concern:*

Be it known that I, HARRIET A. FARNAM, of South Bend, in the county of St. Joseph and State of Indiana, have invented certain Improvements in Fly-Catchers, of which the following is a specification:

The nature of my invention consists in the arrangement of two conical cylinders, in combination with a "bait-cup," in such a manner that the flies are attracted within the cup, and in attempting to escape are secured within one of the cylinders; and to enable others to make and use my invention, I will proceed to describe its construction and operation.

In the accompanying drawings, Figure 1 represents an elevated embodiment of my invention. Fig. 2 represents the outside cylindrical cone with cap or cover. Fig. 3 represents the inner cylindrical cone through which the flies pass into the cone, Fig. 2. Fig. 4 represents the bait-cup, within which are placed the cones, Figs. 2 and 3.

In Fig. 1, B represents the outside cylindrical cone, of perforated or woven metal or other material, about fifteen inches high and eight inches in diameter at the base and three inches in diameter at the top. A represents the cover or lid to cylindrical cone B, to open for the removal of flies. C represents the innermost cylindrical cone, which is placed within cone B, the base of cone C fitting closely to the inside, and about three inches above the base of cone B, cone C having an opening at the top large enough to admit the flies to pass through into cone B. F represents the bait-cup, of tin or other material, of such dimensions as to admit the base of cone B about half way down from top to bottom. The bait-cup F to be made flaring enough to make considerable space between top edge of cup F and outside of cone B. D represents a convex surface on the outside, and a concave surface on the inside, of bait-cup F, in order to allow flies to pass between the inside of bait-cup F and base of cone B.

In Fig. 4, E represents the bait, placed within the cup F to attract the flies.

The foregoing specification being had,

What I claim as my invention, and desire to secure by Letters Patent, is—

The combination of the bait-cup F with the cylindrical cones B and C, substantially as described.

HARRIET A. FARNAM.

Witnesses:
  JOSEPH B. ARNOLD, Jr.,
  JACOB FISHER.